(12) United States Patent
Jiang et al.

(10) Patent No.: US 11,121,734 B2
(45) Date of Patent: Sep. 14, 2021

(54) PASSIVE INTERMODULATION PIM ELIMINATION METHOD, APPARATUS, AND BASE STATION

(71) Applicant: HUAWEI TECHNOLOGIES CO., LTD., Guangdong (CN)

(72) Inventors: Yong Jiang, Shanghai (CN); Jia Lv, Shanghai (CN); Yuxiang Xiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 16/369,336

(22) Filed: Mar. 29, 2019

(65) Prior Publication Data

US 2019/0229760 A1    Jul. 25, 2019

Related U.S. Application Data

(63) Continuation of application No. PCT/CN2016/101285, filed on Sep. 30, 2016.

(51) Int. Cl.
| | | |
|---|---|---|
| *H04B 1/12* | (2006.01) | |
| *H04B 1/04* | (2006.01) | |
| *H04B 1/10* | (2006.01) | |
| *H04W 88/14* | (2009.01) | |
| *H04W 88/08* | (2009.01) | |
| *H04L 27/26* | (2006.01) | |

(52) U.S. Cl.
CPC .............. *H04B 1/123* (2013.01); *H04B 1/04* (2013.01); *H04B 1/109* (2013.01); *H04B 1/1036* (2013.01); *H04L 27/2623* (2013.01); *H04W 88/085* (2013.01); *H04W 88/14* (2013.01); *H04B 2001/0425* (2013.01); *H04B 2001/0433* (2013.01)

(58) Field of Classification Search
None
See application file for complete search history.

(56) References Cited

U.S. PATENT DOCUMENTS

| | | |
|---|---|---|
| 5,930,678 A | 7/1999 | Alley et al. |
| 8,874,153 B2 | 10/2014 | Bevan et al. |
| | (Continued) | |

FOREIGN PATENT DOCUMENTS

| | | |
|---|---|---|
| CN | 103841666 A | 6/2014 |
| CN | 103858355 A | 6/2014 |
| | (Continued) | |

OTHER PUBLICATIONS

International Search Report, dated Jun. 6, 2017, in International Application No. PCT/CN2016/101285 (6 pp.).

*Primary Examiner* — Mariela Vidal Carpio
(74) *Attorney, Agent, or Firm* — Leydig, Voit & Mayer, Ltd.

(57) ABSTRACT

A passive intermodulation elimination method, an apparatus, and a base station are disclosed. The method includes: receiving, by a network device, N pieces of backhauled information, where one piece of the backhauled information includes initial phase information of each carrier on one transmit channel, and N is an integer greater than or equal to 1; and eliminating, by the network device, a PIM of a received signal on a receive channel on the network device based on the N pieces of backhauled information.

13 Claims, 8 Drawing Sheets

(56) References Cited

U.S. PATENT DOCUMENTS

| | | |
|---|---|---|
| 8,983,454 B2 | 3/2015 | Bevan et al. |
| 2012/0295558 A1 | 11/2012 | Wang et al. |
| 2013/0054169 A1* | 2/2013 | Neidhardt .......... H04B 17/0085 |
| | | 702/69 |
| 2013/0170353 A1* | 7/2013 | Liu ................... H04W 72/0486 |
| | | 370/235 |
| 2014/0036736 A1 | 2/2014 | Wyville |
| 2015/0234399 A1* | 8/2015 | Chamberlain ......... G01R 27/16 |
| | | 455/561 |
| 2015/0256233 A1 | 9/2015 | Ou et al. |
| 2016/0301436 A1 | 10/2016 | Zou et al. |
| 2016/0380668 A1* | 12/2016 | Aoki ........................ H04B 1/50 |
| | | 370/278 |
| 2017/0077981 A1* | 3/2017 | Tobisu ................ H04B 1/0475 |
| 2017/0201277 A1 | 7/2017 | Wang et al. |
| 2018/0316385 A1* | 11/2018 | Mukaida ............. H04B 1/7107 |

FOREIGN PATENT DOCUMENTS

| | | |
|---|---|---|
| CN | 103944594 A | 7/2014 |
| CN | 104185271 A | 12/2014 |
| CN | 104244311 A | 12/2014 |
| CN | 104283580 A | 1/2015 |
| CN | 104486282 A | 4/2015 |
| CN | 105306405 A | 2/2016 |

* cited by examiner

PASSIVE INTERMODULATION PIM ELIMINATION METHOD, APPARATUS, AND BASE STATION

CROSS-REFERENCE TO RELATED APPLICATIONS

This application is a continuation of International Application No. PCT/CN2016/101285, filed on Sep. 30, 2016, the disclosure of which is hereby incorporated by reference in its entirety.

TECHNICAL FIELD

This application relates to the field of communications technologies, and in particular, to a passive intermodulation (PassiveInter Modulation, PIM) elimination method, an apparatus, and a base station.

BACKGROUND

In a wireless communications system, a PIM on a network device is an intermodulation signal generated by a transmitted signal on a downlink directly or indirectly passing through a passive device. If the PIM exactly falls within a received signal frequency band of an uplink (uplink), quality of a received signal is affected. To reduce impact of the PIM, usually a PIM elimination technology is used in a baseband processing unit (Base band Unit, BBU) or a radio remote unit (Radio Remote Unit, RRU) to improve the quality of the received signal.

According to an existing PIM elimination technology, when PIM elimination is performed, a BBU performs modeling on a signal on an RRU transmit channel based on a baseband signal to be sent to an RRU, to obtain a cancellation signal used to cancel a PIM, and then superimposes the cancellation signal on a BBU receive channel, thereby eliminating a PIM generated by a transmitted signal of the RRU.

However, in the foregoing method, the cancellation signal is obtained through modeling based on the baseband signal to be sent by the BBU to the RRU, and cannot precisely recover the transmitted signal on the RRU side. Therefore, the cancellation signal obtained through the modeling performed by the BBU cannot completely eliminate the PIM, and consequently interference to the received signal on the uplink still exists.

SUMMARY

Embodiments of this application provide a passive intermodulation elimination method, an apparatus, and a base station, to provide a PIM elimination solution, to reduce interference of a PIM to a received signal on an uplink, thereby improving quality of the received signal.

According to a first aspect, this application provides a passive intermodulation elimination method, including: obtaining, by a network device, N pieces of backhauled information, where one piece of the backhauled information includes initial phase information of each carrier on one transmit channel, and N is an integer greater than or equal to 1; and eliminating, by the network device, a PIM of a received signal on a receive channel on the network device based on the N pieces of backhauled information. Optionally, the N transmit channels are transmit channels of M RRUs, where M is greater than or equal to 1 and less than or equal to N. Each RRU may include at least one transmit channel. Optionally, the network device may be a BBU or an RRU, or may be another network device that performs PIM processing. This is not limited in this application. An initial phase of the carrier is a carrier initial phase used by a to-be-processed transmitted signal in a frequency-shift processing process. Information about the carrier initial phase cannot be learned before frequency-shift is performed on a to-be-transmitted signal. It is inaccurate to perform modeling on the transmitted signal and perform PIM elimination based on this without knowing the information about the carrier initial phase. In addition, different RRUs cannot learn processing information of information about a carrier initial phase of each other. Therefore, receiving the backhauled information and performing PIM elimination based on the backhauled information can more precisely obtain a cancellation signal for the PIM elimination, thereby improving PIM elimination performance, and improving quality of a received signal of an entire system. Further, the network device receives backhauled information from a plurality of RRUs, so that PIM elimination performance in a multi-RRU system can be implemented, and the quality of the received signal of the entire system can be improved.

With reference to the first aspect, in a first possible implementation of the first aspect, the backhauled information may be the initial phase information of each carrier, for example, an initial phase value or indication information that may indicate an initial phase value. Directly sending the initial phase information can reduce a data amount of the backhauled information, and save transmission bandwidth.

With reference to the first aspect, in a second possible implementation of the first aspect, the network device receives N backhauled signals, and the N backhauled signals are respectively single carrier signals on which frequency-shift has been performed and that are on N transmit channels, or multi-carrier mixed signals on which multicarrier combining has been performed and that are on N transmit channels, where N is an integer greater than or equal to 1; and the network device eliminates the PIM of the received signal on the receive channel on the network device based on the N backhauled signals. The frequency-shift means that a currently processed to-be-transmitted signal is shifted to a corresponding carrier location based on a frequency relative location at which the to-be-transmitted signal is located in an entire frequency band. The multicarrier combining means that time-domain superimposition is performed on to-be-transmitted signals at a plurality of different carrier locations, to obtain a multi-carrier mixed signal. For the to-be-transmitted signals at the plurality of different carrier locations, frequency-shift processing may be performed on all the to-be-transmitted signals, or frequency-shift is not performed on at least one to-be-transmitted signal and the frequency-shift processing is performed on the other signals. After obtaining a single carrier signal on which frequency-shift is performed or a multi-carrier mixed signal on which multicarrier combining is performed, the network device obtains a signal including the information about the carrier initial phase. However, the information about the carrier initial phase cannot be learned through modeling, and different RRUs cannot learn the processing information of the information about the carrier initial phase of each other. Therefore, receiving the backhauled signals and performing PIM elimination based on the backhauled signals can more precisely obtain a cancellation signal for the PIM elimination, thereby improving PIM elimination performance, and improving quality of a received signal of an entire system. Further, the network device receives backhauled signals from a plurality of RRUs, so that PIM elimination performance in a multi-RRU system can be implemented, and the quality of the received signal of the entire system can be improved.

With reference to the first aspect or any possible implementation of the first aspect, in a third possible implementation of the first aspect, in addition to the frequency-shift processing or the multicarrier combining processing, crest factor reduction (Crest Factor Reduction, CFR) processing may further be performed on the backhauled signals. A signal on which the CFR processing is performed includes signal amplitude change information (such as a peak value compression degree). However, the signal amplitude change information cannot be learned through modeling either, and different RRUs cannot learn CFR processing information of each other. Therefore, obtaining the backhauled signals on which the CFR processing has been performed can further improve accuracy of the PIM elimination.

With reference to the first aspect or any possible implementation of the first aspect, in a fourth possible implementation of the first aspect, digital pre-distortion (Digital Pre-Distortion, DPD) processing may further be performed on the backhauled signals. A signal on which the DPD processing is performed is used as a backhauled signal and includes more signal amplitude and/or phase change information (for example, amplitude and/or phase change information when the pre-distortion processing is performed on the signal), so that the accuracy of the PIM elimination can further be improved.

With reference to the first aspect or any possible implementation of the first aspect, in a fifth possible implementation of the first aspect, the backhauled signals may further be feedback signals amplified by a radio frequency power amplifier (Power Amplifier, PA for short). The feedback signals may be feedback signals used for the DPD processing, or may be feedback signals used for another purpose. This is not limited in this application. The signals amplified by the PA are closer to a real signal that generates a PIM, and therefore a better PIM elimination effect can be achieved.

During, before, or after the foregoing processing process, a processing process required by another medium radio frequency link may further be performed on the backhauled signals. This is not limited in this application.

With reference to the first aspect or any possible implementation of the first aspect, in a sixth possible implementation of the first aspect, the network device is a BBU, and the method further includes: sending, by M RRUs connected to the network device, the N pieces of backhauled information to the network device, where M is an integer greater than or equal to 1 and less than or equal to N.

With reference to the first aspect or any one of the first to fifth possible implementations of the first aspect, in a seventh possible implementation of the first aspect, the network device is an RRU, and the method further includes: sending, by M RRUs other than the network device, the N pieces of backhauled information to the network device, where M is an integer greater than or equal to 1 and less than or equal to N. Optionally, the M RRUs and the network device are connected to a same BBU.

With reference to the first aspect or any one of the first to fifth possible implementations of the first aspect, in an eighth possible implementation of the first aspect, the network device is an RRU, and the method further includes: receiving, by a BBU connected to the network device, the N pieces of backhauled information sent by M RRUs, where M is an integer greater than or equal to 1 and less than or equal to N; and sending, by the BBU, the N pieces of backhauled information to the network device.

With reference to the sixth to the eighth possible implementations of the first aspect, optionally, any RRU of the M RRUs may include at least one transmit channel, in other words, any RRU may send at least one piece of backhauled information. Optionally, any RRU of the M RRUs may further forward at least one piece of backhauled information of another RRU to the network device, so that the network device uses the at least one piece of backhauled information for the PIM elimination. For example, one or more RRUs of the M RRUs may receive backhauled information sent by another RRU, and then send the received backhauled information of the another RRU and backhauled information of the one or more RRUs to the network device.

With reference to the sixth to the eighth possible implementations of the first aspect, in a ninth possible implementation of the first aspect, that the RRUs send the backhauled information to the network device specifically includes: the RRU may divide one piece of backhauled information into K segments of signals, and send each of the K segments of signals to the network device, where K is an integer greater than or equal to 1. Optionally, before the backhauled information is divided, the backhauled information may further be interleaved. Sending the backhauled information in segments can dynamically adapt to an interface speed between the RRU and the network device, ensuring that the backhauled information can be transmitted.

According to a second aspect, this application provides a network device. The network device has a function of implementing a network device behavior in the method provided in the first aspect. The function may be implemented by hardware, or may be implemented by hardware executing corresponding software. The hardware or software includes one or more modules corresponding to the foregoing function. Optionally, the network device may be a BBU, or may be an RRU.

According to a third aspect, this application provides an RRU. The RRU has a function of implementing any one or more RRU behaviors in the method provided in the first aspect. The function may be implemented by hardware, or may be implemented by hardware executing corresponding software. The hardware or software includes one or more modules corresponding to the foregoing function.

According to a fourth aspect, this application provides a BBU. The BBU has a function of implementing a BBU behavior in the method provided in the first aspect. The function may be implemented by hardware, or may be implemented by hardware executing corresponding software. The hardware or software includes one or more modules corresponding to the foregoing function.

According to a fifth aspect, this application provides a network device. A structure of the network device includes a receiver and a processor. The receiver is configured to support the network device in receiving the information provided in the method in the first aspect. The processor is configured to support the network device in performing a corresponding function in the method in the first aspect, for example, performing PIM elimination based on the backhauled information. In a possible design, the network device may further include a communications unit. The communications unit is configured to support the network device in communicating with another network device, for example, receiving information or an instruction sent by the another network device, and/or sending information or an instruction to the another network device. In a possible design, the structure of the network device may further include a memory. The memory is configured to be coupled to the processor, and store a program instruction and data necessary to the network device.

According to a sixth aspect, this application provides an RRU. A structure of the RRU includes a processor and a transmitter. The processor is configured to support the RRU in performing any one or more RRU behaviors in the method in the first aspect, for example, configured to process a signal on at least one transmit channel, to obtain at least one piece of backhauled information. The transmitter is configured to support the RRU in sending the information provided in the method in the first aspect, for example, sending at least one piece of backhauled information. In a possible design, the RRU may further include a receiver, configured to support the RRU in receiving the information provided in the method in the first aspect. Optionally, the processor and the receiver of the RRU may further be both configured to support the RRU in performing a corresponding function of the network device in the method in the first aspect. In a possible design, the structure of the RRU may further include a memory. The memory is configured to be coupled to the processor, and store a program instruction and data necessary to the RRU.

According to a seventh aspect, this application provides a BBU. A structure of the BBU includes a receiver and a transmitter. The receiver is configured to support the BBU in receiving the information provided in the method in the first aspect. The transmitter is configured to support the BBU in sending the information provided in the method in the first aspect. Optionally, the BBU may further include a processor. The processor is configured to support the BBU in completing or control the BBU to complete the signal receiving and sending operations provided in the method in the first aspect. Optionally, the processor and the receiver may further be both configured to support the BBU in performing a corresponding function of the network device in the method in the first aspect. In a possible design, the structure of the BBU may further include a memory. The memory is configured to be coupled to the processor, and store a program instruction and data necessary to the BBU.

According to an eighth aspect, this application provides a base station. The base station includes the network device in the fifth aspect and at least one RRU in the sixth aspect. In a possible design, the base station may further include the BBU in the seventh aspect.

According to a ninth aspect, this application provides a computer storage medium, configured to store a computer software instruction used by the foregoing network device, including a program designed for executing the foregoing aspect.

According to a tenth aspect, this application provides a computer storage medium, configured to store a computer software instruction used by the RRU. It includes a program designed to perform the foregoing aspects.

According to an eleventh aspect, this application provides a computer storage medium, configured to store a computer software instruction used by the BBU. It includes a program designed to perform the foregoing aspects.

DESCRIPTION OF EMBODIMENTS

Figure 1:
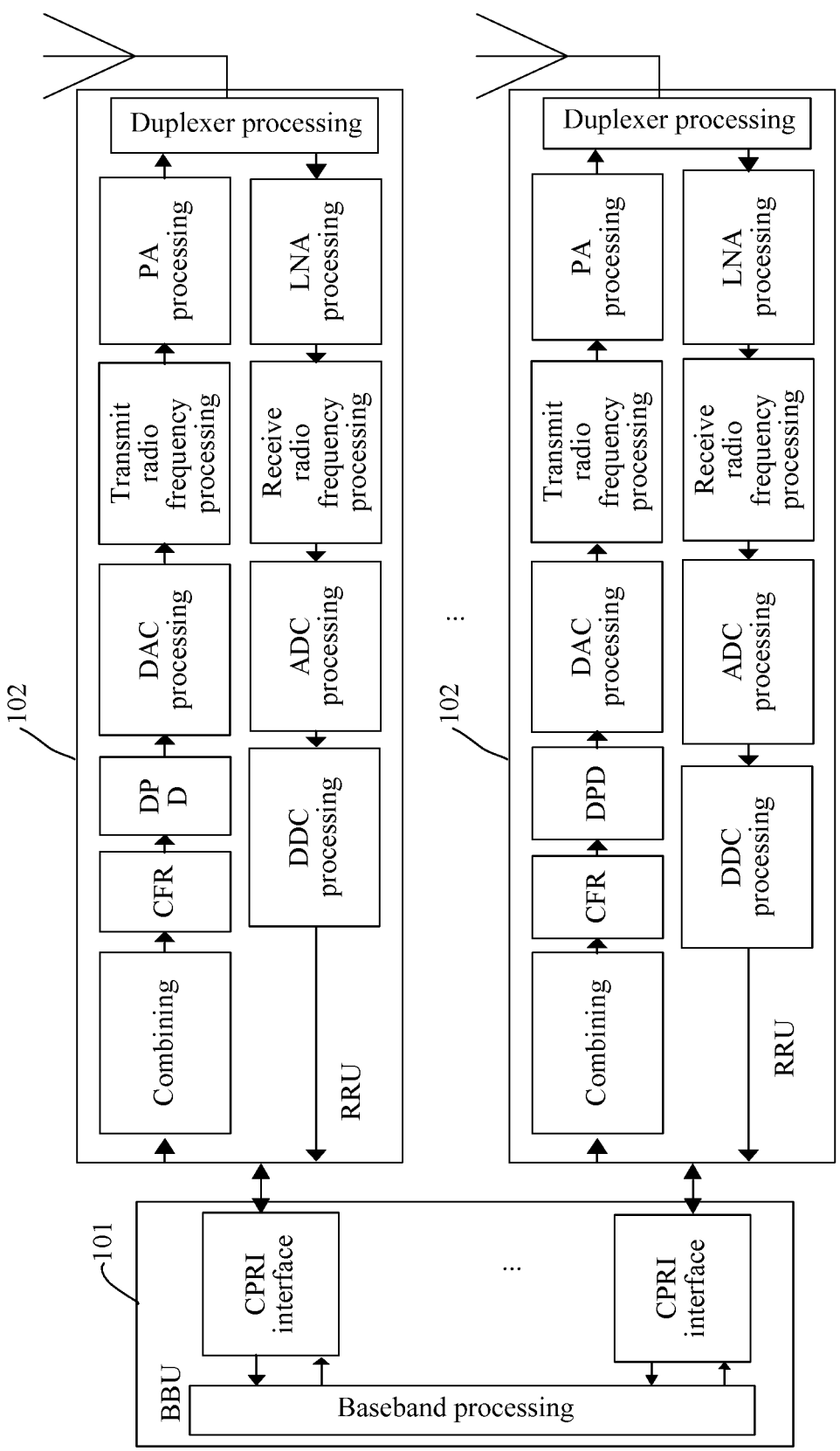
FIG. 1 is a schematic diagram of base station signal processing according to an embodiment of this application.

The following describes the embodiments of this application in detail with reference to the accompanying drawings in this specification.

The embodiments of this application may be applied to a Long Term Evolution (Long Term Evolution, LTE) system and a subsequent evolved system such as 5G (the 5th Generation mobile communication, the fifth generation mobile communication), and wireless communications systems in communications standards such as Universal Mobile Telecommunications System (Universal Mobile Telecommunications System, UMTS) and Global System for Mobile Communications (Global System for Mobile Communication, GSM), or may be applied to another communications system in which PIM elimination needs to be implemented. In this application, nouns "network" and "system" are often interchangeably used, but meanings of the nouns can be understood by persons skilled in the art. In the following, terms related in this application are described first.

A base station in this application may include various forms of macro base stations, micro base stations, relay stations, access points, RRUs, or the like. Certainly, alternatively another network device having a wireless communications function may wirelessly communicate with user equipment. This is not uniquely limited in this application. In different systems that are used, a name of a device having a base station function may be different. For example, on an LTE network, the device may be referred to as an evolved node B (evolved NodeB, eNB or eNodeB), and on a 3G (the 3rd Generation, the third generation) network, the device may be referred to as a node B (Node B).

A receive channel or a transmit channel in this application is a channel that is on the base station and that is configured to receive or transmit a radio signal and process the received or to-be-sent radio signal. The receive channel includes receive channels on a BBU and an RRU, and the transmit channel includes transmit channels on the BBU and the RRU. Usually, on the RRU, the receive channel or the transmit channel corresponds one-to-one to an antenna configured to receive or transmit a radio signal. One RRU may include at least one transmit channel and at least one receive channel, but this is not limited in this application.

A carrier (that may also be referred to as a carrier frequency) in this application refers to a radio wave having a particular frequency and bandwidth (such as 10 M), and is used to carry a to-be-transmitted radio signal. A frequency band refers to some spectrum resources used in wireless communication, for example, an 1800 M frequency band used in the LTE system. Usually, one frequency band includes a plurality of carriers. For example, bandwidth of the 1800 M frequency band is 75 M, and then the frequency band may include m (m>) carriers whose bandwidth is 20 M and n (n>) carriers whose bandwidth is 10 M. Certainly, there may alternatively be another manner of defining a carrier. This is not limited in this application. In this application, one receive channel or transmit channel may process a signal that includes at least one carrier.

Solutions provided in this application are usually applied to a base station in a wireless communications system, or may be applied to another device or apparatus in which PIM elimination needs to be implemented. A base station in an existing wireless communications system usually includes a BBU and at least one RRU connected to the BBU, or may include more BBUs and RRUs connected to the BBUs. This is not limited in this application. Using an example in which a base station includes one BBU and a plurality of RRUs, FIG. 1 is a possible schematic diagram of connection between RRUs and a BBU in a base station. In FIG. 1, a BBU 101 is connected to a plurality of RRUs 102 by using common public radio interfaces (Common Public Radio Interface, CPRI). Certainly, the RRUs may be connected to the BBU by using interfaces of another type. Details are not described herein. The BBU 101 and the RRUs 102 in FIG. 1 are a BBU and RRU signal processing procedure provided in the embodiments of this application.

On a transmit channel on the RRU, CPRI interface processing (such as deframing), intermediate frequency processing, radio frequency processing, and the like are performed on a baseband signal that is on the channel and that is sent by the BBU, and finally a processed radio frequency signal is sent to an antenna for sending. The RRU also performs radio frequency processing, intermediate frequency processing, and the like on a radio signal received by the antenna, to convert the radio signal into a baseband signal, and uses the CPRI interface to send the baseband signal to the BBU for baseband processing. It should be noted that, only one transmit channel and one receive channel are shown in an RRU 102 in FIG. 1. In reality, an RRU may include at least one transmit channel and at least one receive channel. This is not limited in this application.

On the transmit channel, the RRU first performs combining processing on the baseband signal. With reference to a specific procedure of the combining processing shown in FIG. 2, a process of performing combining processing on the baseband signal may include processes such as upsampling, frequency-shift, and multicarrier signal superimposition. Specifically, when a signal processed by the RRU is a single carrier signal, the RRU performs upsampling and frequency-shift processing on the baseband signal. In particular, the frequency-shift processing may alternatively not be performed on a single carrier signal that is currently being processed. For example, if a carrier in this case is exactly at a middle location of a frequency band in which the carrier is located, the frequency-shift processing does not need to be performed on the signal. For example, in a frequency band whose bandwidth is 75 M, a relative location of the entire frequency band is usually described by using −37.5 M to +37.5 M. If a signal processed by the RRU is a single carrier signal whose bandwidth is 10 M, and a relative location that is in the 75 M bandwidth and that is of a carrier used by the current signal is 27.5 M to 37.5 M, the frequency-shift needs to be performed on the signal. If a relative location that is in the 75 M bandwidth and that is of a carrier used by the current signal is −5 M to +5 M, the frequency-shift does not need to be performed on the signal. When a signal processed by the RRU is a multicarrier signal, the RRU performs upsampling on the signal, then performs frequency-shift on a plurality of signals based on different carrier locations at which the plurality of signals are located, and then performs time-domain superimposition on the plurality of signals on which the frequency-shift has been performed. In this way, multicarrier combining is implemented, and a multi-carrier mixed signal is obtained. In particular, the multicarrier signal may alternatively be a signal on which the frequency-shift does not need to be performed. A specific situation is the same as that of a single carrier signal on which the frequency-shift does not need to be performed. Details are not described again. In a frequency-shift process, an initial phase of a carrier signal needs to be determined based on a numerically controlled oscillator (numerically controlled oscillator, NCO).

After performing combining, the RRU performs crest factor reduction (Crest Factor Reduction, CFR) processing on the signal. After the CFR processing, a peak value of the signal is compressed. A signal after the compression is different if a different CFR processing solution is used.

The RRU further performs digital pre-distortion (Digital Pre-Distortion, DPD) processing on the signal on which the CFR processing is performed. In the DPD processing, features, such as amplitude and a phase, of the signal are dynamically adjusted, to reduce distortion of a transmitted signal.

The signal on which the DPD processing is performed is converted into an analog signal by using a digital-to-analog converter (Digital-to-Analog Conversion, DAC). The analog signal is shifted to a radio frequency through transmit radio frequency processing, and then is amplified by using a power amplifier (Power Amplifier, PA for short). After duplexer processing is performed on the analog signal, the analog signal is sent by using the antenna. After the signal is amplified by using the PA, a backchannel generates, based on the signal amplified by using the PA, a feedback signal used for DPD or used for another front-end module.

A PIM is usually an intermodulation signal generated by a transmitted signal by using a passive device such as a duplexer, a tower-mounted amplifier, or an antenna feeder. Therefore, when a signal used to calculate a cancellation signal during PIM elimination is closer to a processing location at which the PIM is generated, an effect of the PIM elimination is better. In the prior art, when the BBU performs, based on a baseband signal, modeling on a radio frequency signal that generates a PIM, and calculates a cancellation signal based on a signal generated through the modeling, a BBU cannot learn information such as an initial phase of a carrier signal, a CFR processing solution, a DPD processing result, and a processing result of PA amplification, and therefore it is difficult for the cancellation signal calculated by the BBU through the modeling to recover a real signal that generates the PIM. Consequently, finally the PIM cannot be completely canceled.

Correspondingly, on a receive channel on an RRU, after a signal received by an antenna is processed by a duplexer, the RRU processes the signal by using a low noise amplifier (Low Noise Amplifier, LNA), an analog to digital converter (Analog to digital converter, ADC), receive radio frequency processing, a digital down converter (Digital Down Converter, DDC), and the like, to obtain a baseband signal, and sends the signal to the BBU for further processing.

Figure 2:
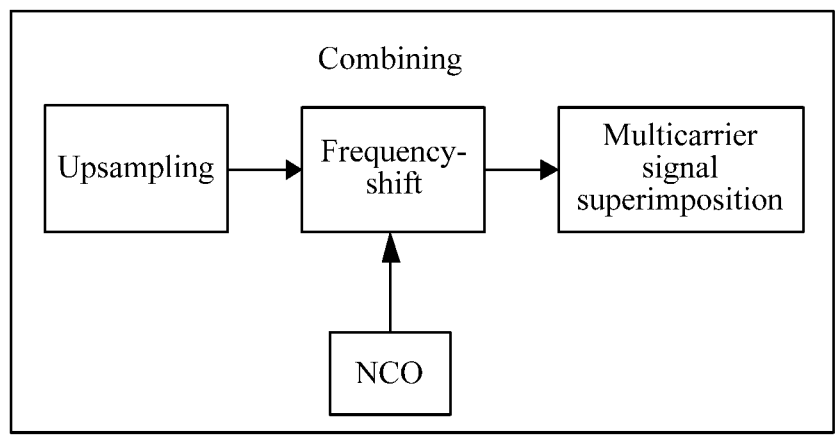
FIG. 2 is a schematic diagram of combining processing according to an embodiment of this application.

It should be noted that, a BBU and RRU signal processing process and an internal structure shown in FIG. 1 and FIG. 2 are only an example to facilitate understanding, and are not used to limit this application. On an actual network, a BBU and RRU connection architecture, an internal structure, and a signal processing process may alternatively be designed in another manner. Details are not described herein.

Figure 3:
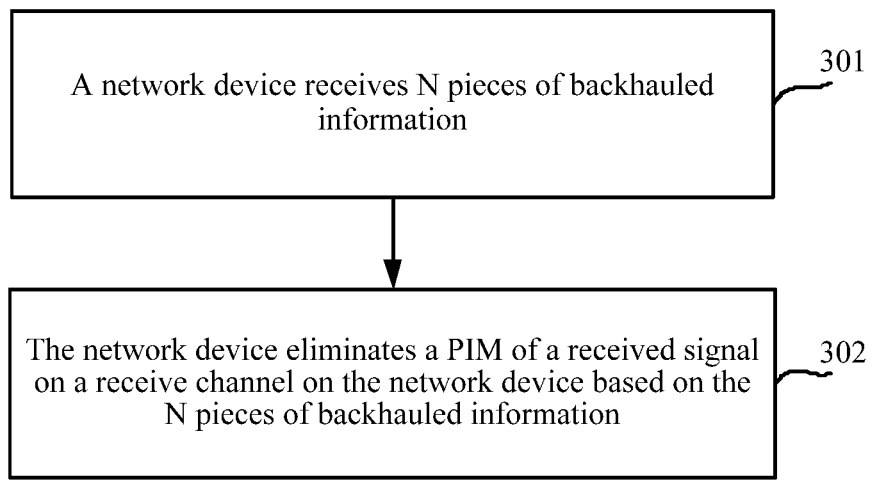
FIG. 3 is a schematic flowchart of a passive intermodulation elimination method according to an embodiment of this application.

FIG. 3 is a flowchart of a PIM elimination method according to an embodiment of this application.

In a part 301, a network device receives N pieces of backhauled information. One piece of the backhauled information includes initial phase information of each carrier on one transmit channel, and N is an integer greater than or equal to 1.

In an embodiment, the backhauled information may be carrier initial phase information of each carrier on each transmit channel, for example, an initial phase value or information that indicates an initial phase value. For example, a signal processed on a transmit channel is a multicarrier signal including three carriers. During a process of performing frequency-shift on three signals, it is determined that initial phases of the three carriers are respectively $\varphi_1$, $\varphi_2$, and $\varphi_3$. For example, $\varphi_1=\pi/2$, $\varphi_2=3\pi/4$, and $\varphi_3=\pi/6$, and then an RRU may directly send, to the network device, values of $\varphi_1$, $\varphi_2$, and $\varphi_3$ as the backhauled information, or may send, to the network device, indication information as the backhauled information, where the indication information can indicate values of $\varphi_1$, $\varphi_2$, and $\varphi_3$. For example, several bits are used to indicate different value ranges of initial phases, and when a value of an initial phase falls within a value range, an index value corresponding to this range is sent. Specifically, if "00" is used to indicate that a value of an initial phase is 0 to $\pi/3$, when the value of the initial phase is $\pi/6$, "00" may be sent to indicate a value range of a current initial phase, and the network device selects a specific value from the range to use.

In another embodiment, the backhauled information may be backhauled signals. In other words, one of the backhauled signals is a single carrier signal on which frequency-shift has been performed and that is on one transmit channel, or a multi-carrier mixed signal on which multicarrier combining has been performed and that is on one transmit channel. The frequency-shift or the multicarrier combining has been performed on the backhauled signals, and therefore the backhauled signals include initial phase information of carriers. The RRU may send, to the network device, the signals as the backhauled information. Optionally, after the frequency-shift or the multicarrier combining has been performed on the backhauled signals, another intermediate frequency and/or radio frequency signal processing process may further be performed on the backhauled signals. This is not limited in this application.

Optionally, when being transmitted by using BBU and RRU interfaces, the backhauled information may alternatively be transmitted in segments based on an interface transmission specification or a system design requirement. Optionally, interleaving processing may further be performed on the backhauled information.

Optionally, the network device may be a BBU, or may be an RRU.

Optionally, the N pieces of backhauled information correspond to N transmit channels, and the N transmit channels belong to at least one RRU.

In a part 302, the network device eliminates a PIM of a received signal on a receive channel on the network device based on the N pieces of backhauled information.

In an embodiment, based on the N pieces of backhauled information, the network device calculates a PIM generated by the N transmit channels on the received signal on the receive channel, that is, calculates a cancellation signal, and subtracts the cancellation signal from the received signal, to eliminate the PIM.

Specifically, if the backhauled information received by the network device is information about the values of the initial phases of the carriers in step 301, a radio frequency signal may be constructed based on the initial phases and the sent baseband signal, to calculate the cancellation signal. If the backhauled information received by the network device is the backhauled signals in step 301, the cancellation signal may be directly calculated based on the backhauled signals. A specific calculation manner is not limited in this application.

Figure 4:
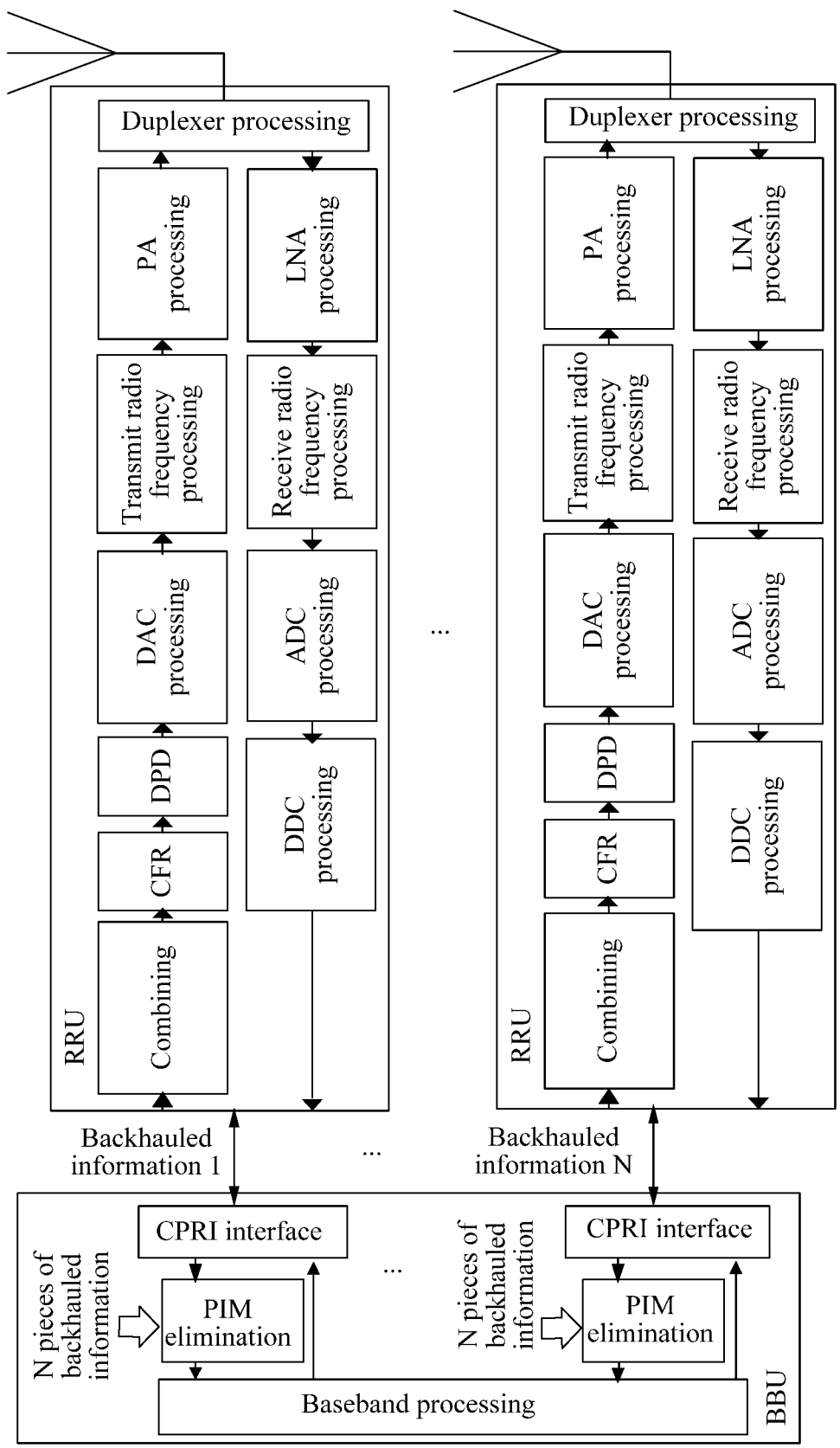
FIG. 4 is a schematic diagram of implementing a passive intermodulation elimination method according to an embodiment of this application.

FIG. 4 is a schematic diagram of implementing a PIM elimination method according to an embodiment of this application.

In the PIM elimination method shown in FIG. 4, a BBU serves as a network device to perform PIM elimination, the BBU is connected to at least one RRU, each RRU includes at least one transmit channel and one receive channel, and each transmit channel and each receive channel may process a single carrier signal or may process a multicarrier signal. For a clear description, in this embodiment of this application, an example in which one RRU includes one transmit channel and one receive channel is used. When one RRU includes more receive channels and transmit channels, a generation manner, a sending manner, a receive manner, a PIM elimination manner, and the like of backhauled information of another transmit channel and another receive channel are consistent with those in implementations described in this embodiment. Details are not subsequently described again. For a BBU and RRU architecture and a signal processing manner, refer to the embodiment descriptions corresponding to FIG. 1 and FIG. 2. Details are not described herein again.

In the PIM elimination method shown in FIG. 4, each transmit channel on the RRU generates backhauled information of the channel.

In an embodiment, the backhauled information may be initial phase information of carriers on the transmit channel. For details, refer to the description in the part 301. Details are not described herein again.

With reference to the embodiment description corresponding to FIG. 2, the initial phase information of the carriers is determined when an NCO generates the carriers. Therefore, the initial phase information of the carriers may be extracted, as the backhauled information, from a process in which the NCO generates the carriers or a frequency-shift processing process.

In another embodiment, the backhauled information may be backhauled signals. For details, refer to the description in the part 301.

Figure 5:
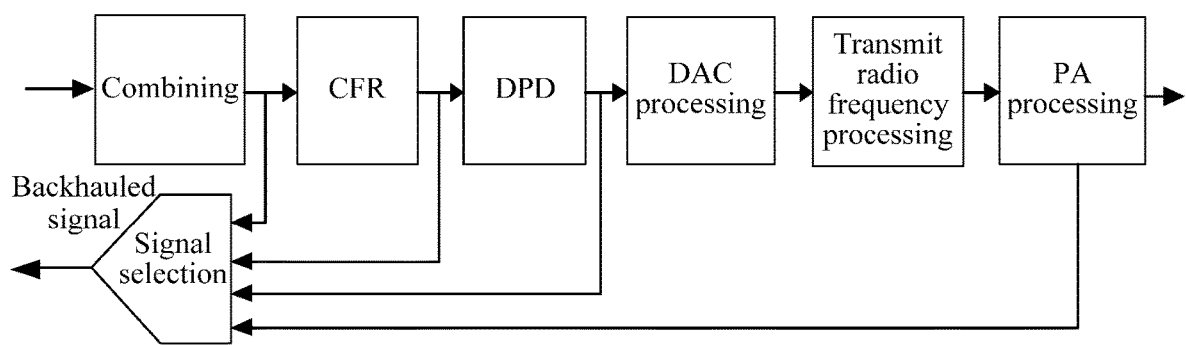
FIG. 5 is a schematic diagram of backhauled signal processing according to an embodiment of this application.

Specifically, with reference to FIG. 5, the backhauled signals may be signals on which combining processing has been performed. After the combining processing, combining processing and frequency-shift processing have been performed on single carrier signals and frequency-shift and multicarrier signal superimposition processing have been performed on multicarrier signals. Both the single carrier signals and the multicarrier signals include the initial phase information of the carriers, and therefore may be used as the backhauled signals for PIM elimination.

The backhauled signals may alternatively be signals on which combining processing and CFR processing have been performed. In this case, the backhauled signals not only include the initial phase information of the carriers, but also include CFR clipping processing information, and may be used to implement more accurate PIM elimination.

The backhauled signal may alternatively be signals on which combining processing, CFR processing, and DPD processing have been performed. In this case, the backhauled signals further include DPD processing information, and may be used to implement more accurate PIM elimination.

The backhauled signals may alternatively be feedback signals on which combining processing, CFR processing, DPD processing, digital-to-analog conversion processing, radio frequency processing, and PA amplification processing have been performed. The feedback signals may be feedback signals used for DPD processing, or may be feedback signals used for another module. In this case, the backhauled signals are closer to a real signal that generates the PIM, and therefore can support more accurate PIM elimination.

At least one of the foregoing one or more optional backhauled signals may be finally selected through backhauled signal selection processing, and is sent to the network device as final backhauled signal.

Certainly, the foregoing processing process and sequence that the backhauled signals go through may alternatively have another combination. For example, a signal obtained in at least one step thereof is omitted. Processing steps that the backhauled signals go through are also not limited to the processing. For example, another required processing is added to the foregoing steps. This is not limited in this application. When processing a transmitted signal, an RRU may use, as backhauled signals, any type of signals generated in the foregoing processing process.

It should be noted that, different types of the backhauled information may be used in combination. For example, backhauled initial phase information is used on some channels, and backhauled signals are used on some channels. This is not limited in this application.

After generating the backhauled information, the RRU sends the backhauled information to the network device by using a CPRI interface (in this embodiment, the network device is a BBU).

There may be a plurality of implementations in which the RRU sends the backhauled information to the network device. Using an example in which the RRU sends a backhauled signal, the RRU may divide the backhauled signal into K segments of signals, and send the K segments of signals to the network device. K is a positive integer, and a value of K may be determined based on an actual situation. For example, the value of K may be equal to a ratio of a sampling rate to a backhaul speed of a backhauled signal needing to be backhauled. Specifically, if the sampling rate of the backhauled signal is 122.88 M, and a maximum speed of backhaul between the RRU and the BBU by using the CPRI is 30.72 M, K may be determined to be 4. The RRU divides the backhauled signal into four segments based on a sequence. For example, a 122.88 M signal with a particular length includes 40000 sampling points, namely, s0, s1, s2, . . . , and s39999. After the signal is divided into four segments, a first segment is s0 to s9999; a second segment is s10000 to s19999; a third segment is s20000 to s29999; and a fourth segment is s30000 to s39999. The RRU backhauls each segment of signal to the network device.

After receiving each segment of signal, the network device splices the four segments of signals into the 122.88 M signal with a particular length.

In a possible embodiment, the RRU may divide the backhauled signal into K segments of signals after interleaving the backhauled signal, and send each of the K segments of signals to the network device.

For example, the backhauled signal is a signal on which combining processing has been performed on a transmit channel on the RRU. After interleaving the backhauled signal, the RRU divides the backhauled signal into four segments. For example, a 122.88 M signal with a particular length includes 40000 sampling points, namely, s0, s1, s2, . . . , and s39999. After the signal is interleaved and divided into four segments, a first segment is s0, s4, s8, . . . , and s39996; a second segment is s1, s5, s9, . . . , and s39997; a third segment is s2, s6, s10, . . . , and s39998; and a fourth segment is s3, s9, s11, . . . , and s39999. The RRU backhauls each segment of signal to a BBU side, and after receiving each segment of signal, the BBU de-interleaves each segment of signal and splices each segment of signal into the 122.88 M signal with a particular length.

Optionally, when the backhauled information is initial phase information of carriers, backhaul may be performed through transmission in segments. For a specific implementation, refer to the manner of backhauling the backhauled signals in segments. Details are not described again.

Optionally, N pieces of backhauled information corresponding to the N transmit channels may be sent to the network device by M RRUs. M is less than or equal to N. Backhauled information on transmit channels on one or more RRUs may be forwarded by at least one another RRU, so that the backhauled information is sent to the network device. For example, after generating backhauled information 1, an RRU 1 sends the backhauled information 1 to an RRU 2. The RRU 2 receives the backhauled information 1 and sends the backhauled information 1 to the network device. Optionally, the RRU 2 may alternatively send both backhauled information 2 that is generated on a transmit channel of the RRU 2 and the backhauled information 1 to the network device. If the backhauled information is forwarded by another RRU, more different network architectures can be supported to perform PIM elimination, for example, an RRU 1 not connected to the current network device. However, a transmitted signal of the RRU 1 also generates a PIM for a received signal of the current network device. Then, backhauled information of the RRU 1 may be forwarded by another RRU 2 connected to the current network device, thereby supporting the current network device to complete a PIM.

A BBU receives the N pieces of backhauled information, and performs PIM elimination on a received signal on a receive channel on the BBU based on the N pieces of backhauled information, to obtain the received signal on which the PIM elimination has been performed and that is on the receive channel.

In an embodiment, the N pieces of backhauled information are carrier initial phase information of N channels. For example, when the N pieces of backhauled information are initial phase values, a PIM elimination process is as follows:

(1) The backhauled information is p11 to $p1k_1$, . . . , and pN1 to $pNk_N$, where p11 to $p1k_1$ are initial phase values of a carrier 1 to a carrier k1 on a first transmit channel, k1 is a quantity of carriers on the first transmit channel, and N is a quantity of transmit channels. Specific carrier frequencies on each transmit channel are f11 to $f1k_1$, . . . , and fN1 to $fNk_N$. Optionally, information about the carrier frequencies may be determined in advance, or may be sent by an RRU to a BBU. The BBU reconstructs combined signals x1 to xN on N transmit channels based on the backhauled information, where $$x1 = bb11 \times duc(f11, p11) + \ldots + bb1k_1 \times duc(f1k_1, p1k_1),$$

$$\ldots$$

$$xN = bbN1 \times duc(fN1, pN1) + \ldots + bbNk_N \times duc(fNk_N, pNk_N),$$

where $bb11$ to $bb1k_1, \ldots$, and $bbN1$ to $bbNk_N$ are baseband signals transmitted by the BBU to the RRU, and duc(f, p) indicates digital frequency conversion whose carrier frequency is f and carrier initial phase is p.

(2) Frequency-shift is performed on each of the x1 to xN based on relative locations of carrier frequencies of a transmit channel and a receive channel, to shift x1 to xN to a location corresponding to the carrier frequency of the receive channel, to obtain x'1 to x'N.

(3) The BBU generates ideal intermodulation signals imd1 to imdN based on x'1 to x'N, where imd1=x'1×x'1×conj (x'1), ..., and imdN=x'N×x'N×conj (x'N), where conj indicates conjugation.

(4) The BBU obtains mixture coefficients c1 to cN of standard intermodulation signals by using an algorithm such as a least mean square algorithm (Least Mean Square, LMS) or a least square algorithm (Least Square, LS).

(5) A signal rxout after PIM elimination is obtained: rxout=rxing−c1×imd1− . . . −cN×imdN, where rxin is a received signal on the receive channel before the PIM elimination is performed.

Certainly, the foregoing is only one implementation of the present invention, and the PIM elimination may alternatively be implemented by using another method. Details are not described herein.

In another embodiment, the N pieces of backhauled information are backhauled signals. For example, a PIM elimination process may be as follows:

(1) A BBU performs frequency-shift on each of N backhauled signals $A_1, \ldots$, and $A_N$ based on relative locations of carrier frequencies of a transmit channel and a receive channel, to shift $A_1, \ldots$, and $A_N$ to a location corresponding to the carrier frequency of the receive channel, to obtain $A'_1, \ldots$, and $A'_N$.

(2) Ideal intermodulation signals imd1 to imdN are generated based on $A'_1, \ldots$, and $A'_N$, where imd1=A'1×A'1×conj (A'1), ..., and imdN=A'N×A'N×conj(A'N), where conj indicates conjugation.

(3) Mixture coefficients c1 to cN of standard intermodulation signals are obtained by using an algorithm such as LMS or LS.

(4) A signal rxout after PIM cancelation is obtained: rxout=rxin−c1×imd1− . . . −cN×imdN, where rxin is a received signal on the receive channel before PIM elimination is performed.

Certainly, the foregoing is only one implementation of the present invention, and the PIM cancelation may alternatively be implemented by using another method. Details are not described herein.

Figure 6:
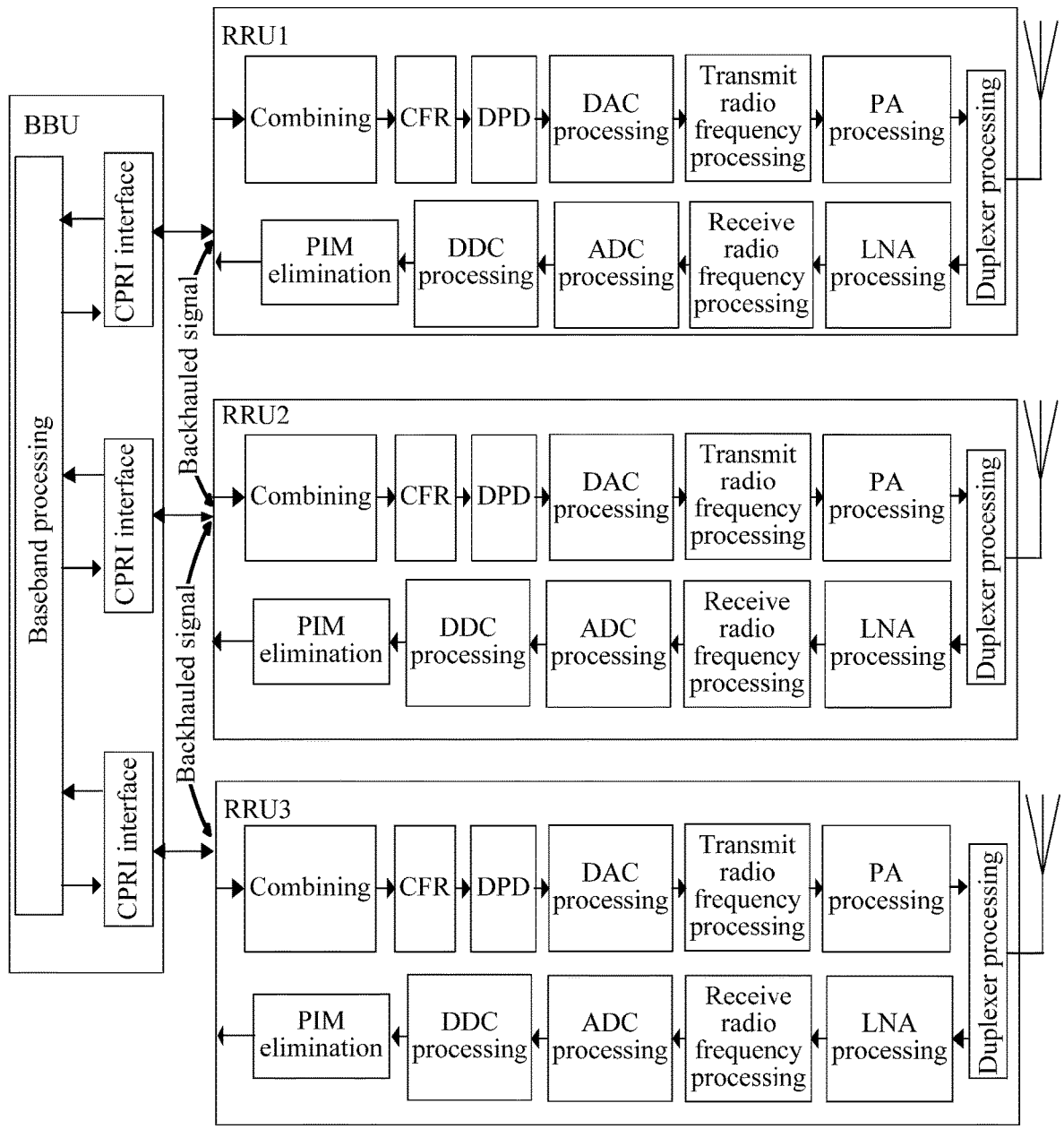
FIG. 6 is a schematic diagram of implementing another passive intermodulation elimination method according to an embodiment of this application.

FIG. 6 is a schematic diagram of implementing another PIM elimination method according to an embodiment of this application.

In the PIM elimination method shown in FIG. 6, an RRU serves as a network device to perform PIM elimination. Each RRU independently performs PIM elimination on a received signal on a receive channel of the RRU. The following provides a description by using PIM elimination of one RRU as an example, and PIM elimination processing of another RRU is the same. In addition, to simplify the accompanying drawing and the description, one BBU and three RRUs connected to the BBU are used as an example in FIG. 6. In an actual case, one BBU may be connected to more RRUs. A manner in which this embodiment of this application is applied to another RRU is consistent with that for the described RRU.

An RRU 1 to an RRU 3 respectively generate backhauled information of transmit channels of the RRU 1 to the RRU 3. For a specific backhauled information generation manner, refer to the embodiments corresponding to FIG. 3 to FIG. 5. Details are not described herein again.

Optionally, when an RRU performs PIM elimination, if backhauled information is carrier initial phase information, the RRU that performs the PIM elimination further needs to obtain signal information processed by another RRU, to reconstruct a radio frequency signal used to generate a cancellation signal. The following provides a description by using an example in which the backhauled signal is backhauled information.

Using PIM elimination of the RRU 1 as an example, the RRU 1 receives backhauled information of the RRU 2 and the RRU 3.

Optionally, the RRU 2 and the RRU 3 may directly send or may send through forwarding, backhauled signals of the RRU 2 and the RRU 3 to the RRU 1. For example, the RRU 3 sends the backhauled signal of the RRU 3 to the RRU 2, and then the RRU 2 sends the backhauled signal of the RRU 2 and the backhauled signal of the RRU 3 to the RRU 1. This backhauled information forwarding manner can simplify a connection relationship between a plurality of RRUs, and simplify a network structure. For a specific backhauled signal sending manner, refer to the embodiments corresponding to FIG. 3 to FIG. 5. An only difference is that, in this embodiment, a backhauled signal of an RRU is sent to another RRU to perform PIM elimination. Details are not described herein again. In particular, when an RRU forwards a backhauled signal of another RRU, the processing manners of backhauled signal segmentation and/or interleaving in the embodiments corresponding to FIG. 3 to FIG. 5 may still be used. Details are not described herein again.

The RRU 1 performs PIM elimination on a received signal on a receive channel of the RRU 1 based on the received backhauled information of the RRU 2 and the RRU 3, and backhauled information of a transmit channel of the RRU 1. For a specific PIM elimination manner, refer to related descriptions in the embodiments corresponding to FIG. 3 to FIG. 5. Details are not described herein again.

Figure 7:
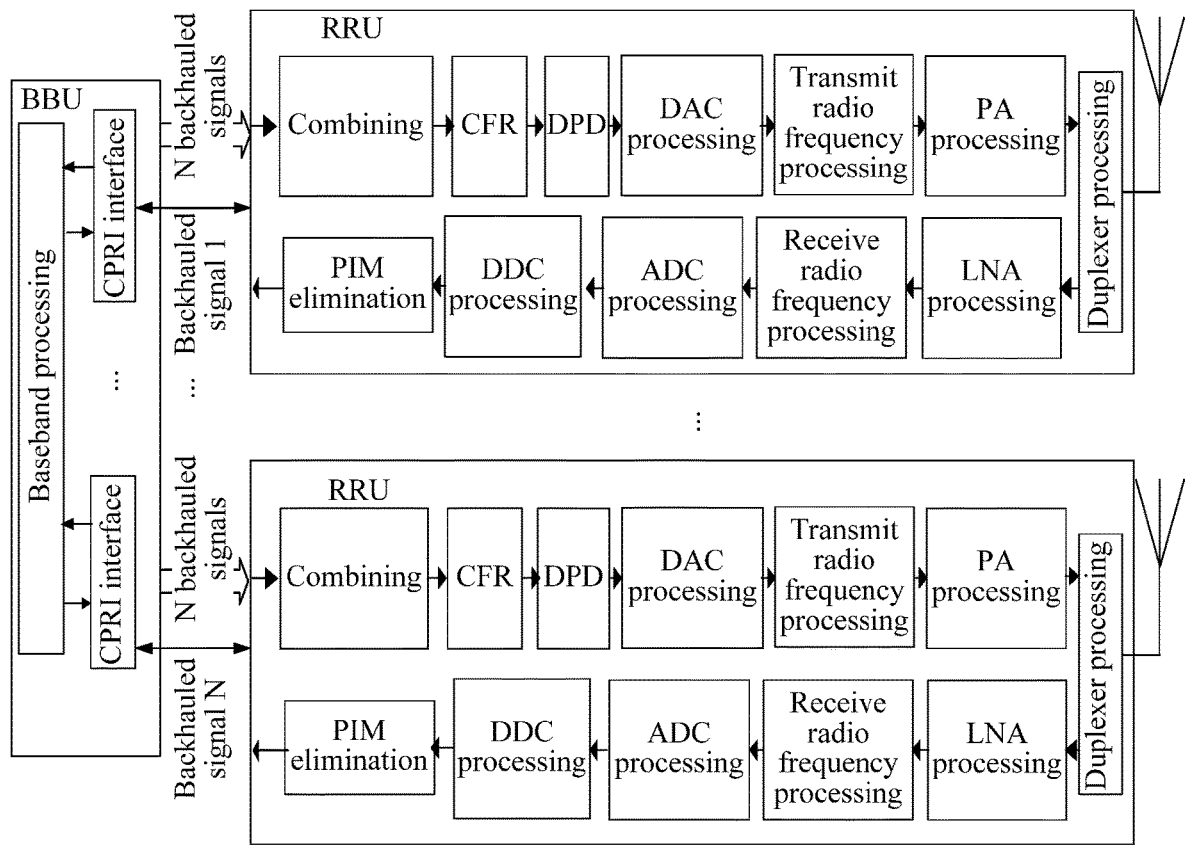
FIG. 7 is a schematic diagram of implementing still another passive intermodulation elimination method according to an embodiment of this application.

FIG. 7 is a schematic diagram of implementing still another PIM elimination method according to an embodiment of this application.

In the PIM elimination method shown in FIG. 7, an RRU serves as a network device to perform PIM elimination. A difference from the embodiment corresponding to FIG. 6 is that, in this embodiment, the RRU sends generated backhauled information to a BBU, and then the BBU sends all backhauled information to each RRU that needs to perform PIM elimination. In this way, an existing interface between the RRU and the BBU may be used, so that RRUs do not need to transmit backhauled information to each other.

Optionally, when an RRU sends backhauled information of the RRU to the BBU, or when the BBU sends all backhauled information to an RRU, the processing manners of backhauled information segmentation and/or interleaving in the embodiments corresponding to FIG. 3 to FIG. 5 may be used. Details are not described herein again.

Optionally, when sending backhauled information to each RRU, the BBU may send backhauled information including backhauled information of the RRU, or may send only backhauled information of another RRU. For example, when an RRU 1 needs to perform PIM elimination on N pieces of backhauled information including backhauled information of the RRU 1, after the BBU receiving the N pieces of backhauled information, the BBU may send all the N pieces of backhauled information to the RRU 1, or may send N−m pieces of backhauled information not including the backhauled information of the RRU 1 to the RRU 1, where m indicates a quantity of pieces of backhauled information generated by the RRU 1. In particular, if the RRU 1 further forwards backhauled information of another RRU to the BBU, the BBU may alternatively choose whether to send, to the RRU 1, the backhauled information forwarded by the RRU 1.

Unless otherwise stated in the above, for another processing process in the embodiment corresponding to FIG. 7, refer to the embodiment corresponding to FIG. 6. Details are not described herein again.

It should be noted that, numbers of RRUs in this application, for example, "an RRU 1" and "an RRU 2", are only for clear description, and do not constitute a limitation.

It should be noted that, in a scenario in which a plurality of BBUs coexist in one base station and each BBU is connected to at least one RRU, a PIM on a receive channel on the BBU or the RRU may also be eliminated by using the method provided in this embodiment of this application. Transmission of backhauled information between a BBU and an RRU or between RRUs that are not directly connected to each other may be implemented through the forwarding provided in the foregoing embodiments. For details, refer to the foregoing descriptions. Details are not described herein again.

In the foregoing embodiments of this application, a data transmission method provided in the embodiments of this application is described separately from the perspectives of network elements and interaction between the network elements. To implement the foregoing functions, the network elements, such as a BBU and an RRU, include corresponding hardware structures and/or software modules for performing the functions. Persons skilled in the art should be easily aware that units and algorithm steps in the examples described with reference to the embodiments disclosed in this specification may be implemented in a form of hardware or in a form of a combination of hardware and computer software in this application. Whether the functions are performed by hardware or computer software driving hardware depends on particular applications and design constraint conditions of the technical solutions. Persons skilled in the art may use different methods to implement the described functions for each particular application, but it should not be considered that the implementation goes beyond the scope of this application.

Figure 8:
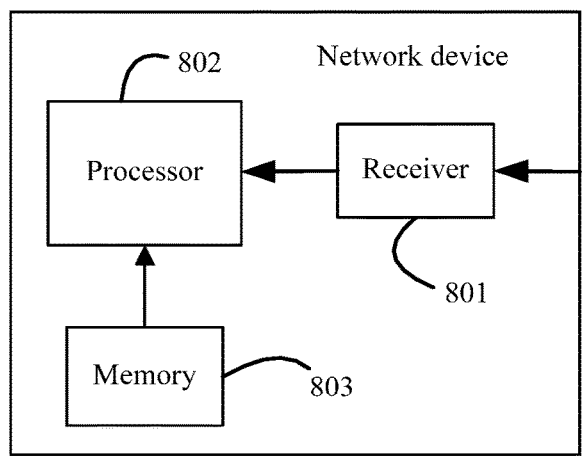
FIG. 8 is a schematic structural diagram of a network device according to an embodiment of this application.

FIG. 8 is a possible schematic structural diagram of a network device according to an embodiment of this application.

Optionally, the data sending device may be a BBU, or may be an RRU, or may be an apparatus including a chip and/or various discrete devices.

In an embodiment, a structure of the network device includes a receiver and a processor. In an embodiment, the network device may further include a memory. In an embodiment, the network device may further include a communications unit, configured to communicate with another network device. In the embodiment corresponding to FIG. 8, a structure of the network device provided in this application includes a receiver 801, a processor 802, and a memory 803. The receiver is used for the backhauled information provided in the foregoing embodiments, the processor is configured to perform PIM elimination based on the backhauled information, and complete another processing process related to the network device in the embodiments corresponding to FIG. 3 to FIG. 7.

Figure 9:
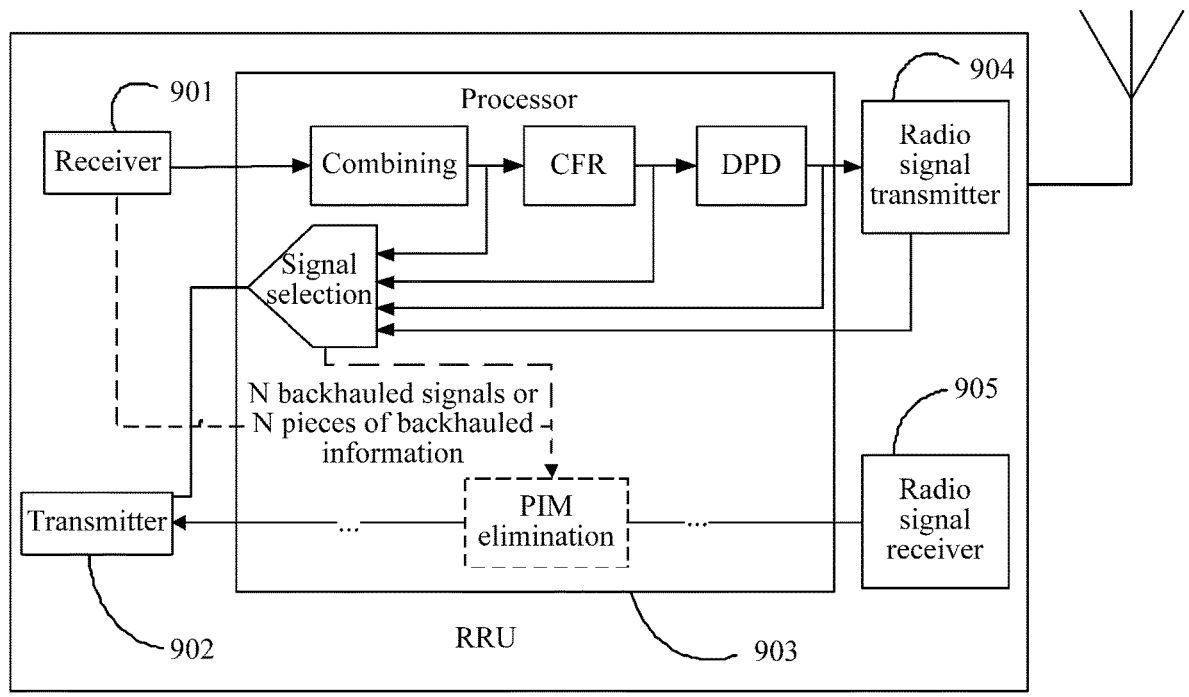
FIG. 9 is a schematic structural diagram of an RRU according to an embodiment of this application.

FIG. 9 is a possible schematic structural diagram of an RRU according to an embodiment of this application.

In an embodiment, a structure of the RRU includes a processor and a transmitter. In an embodiment, the RRU may further include a receiver. In a specific embodiment, the structure of the RRU may further include a memory. In a specific embodiment, the structure of the RRU may further include a radio signal transmitter and a radio signal receiver. In the embodiment corresponding to FIG. 9, the structure of the RRU includes a receiver 901, a transmitter 902, a processor 903, a radio signal transmitter 904, and a radio signal receiver 905. The receiver 901 is configured to support the RRU in receiving information or an instruction sent by another RRU or a BBU, for example, receiving a baseband signal sent by the BBU, and/or receiving backhauled information when PIM elimination needs to be performed. The transmitter 902 is configured to support the RRU in sending required information or a required instruction to the BBU or the another RRU, for example, sending a processed radio received signal, and/or sending backhauled information of the RRU to the BBU or the another RRU. The processor 903 is configured to support the RRU in performing any one or more RRU behaviors in the embodiments corresponding to FIG. 3 to FIG. 7, for example, generating backhauled information and/or performing PIM elimination. The radio signal transmitter 904 and the radio signal receiver 905 are configured to support the RRU in performing sending and receiving processing on a radio signal sent and received by using an air interface. For example, in the radio signal transmitter, processing such as processing related to a radio frequency signal and power amplification may be performed. Certainly, the processing may alternatively be performed in the processor. This is not limited in this application.

FIG. 9 shows only a simplified design of an RRU. During actual application, the RRU may further include any quantity of transmitters, receivers, processors, memories, radio signal transmitters, radio signal receivers, and the like, and all RRUs that can implement this application fall within the protection scope of this application.

Figure 10:
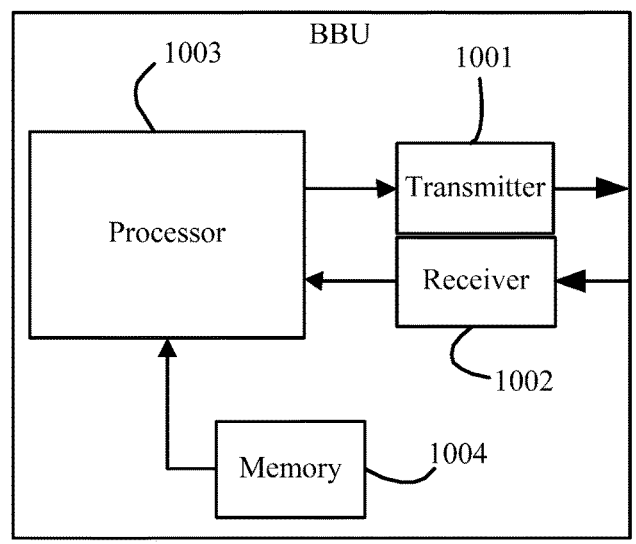
FIG. 10 is a schematic structural diagram of a BBU according to an embodiment of this application.

FIG. 10 is a possible schematic structural diagram of a BBU according to an embodiment of this application.

In an embodiment, a structure of the BBU includes a receiver and a transmitter. In an embodiment, the BBU may further include a processor. In an embodiment, the BBU may further include a memory. In an embodiment, the BBU may further include a communications unit, configured to communicate with another BBU. In the embodiment of FIG. 10, the BBU includes a transmitter 1001, a receiver 1002, a processor 1003, and a memory 1004. The transmitter 1001 is configured to support the BBU in sending a required signal or instruction in the embodiments of this application to an RRU, for example, sending backhauled information or sending data that needs to be sent by using another CPRI interface. The receiver 1002 is configured to support the BBU in receiving a required signal or instruction in the embodiments of this application, for example, receiving backhauled information. The processor 1003 is configured to support the BBU in performing the processing processes related to the BBU in the foregoing embodiments of FIG. 3 to FIG. 7, for example, one or more functions such as baseband signal processing, PIM elimination, control of receiving and forwarding of the backhauled information. The memory 1004 is configured to be coupled to the processor, and store a program instruction and data necessary to the BBU.

Figure 11:
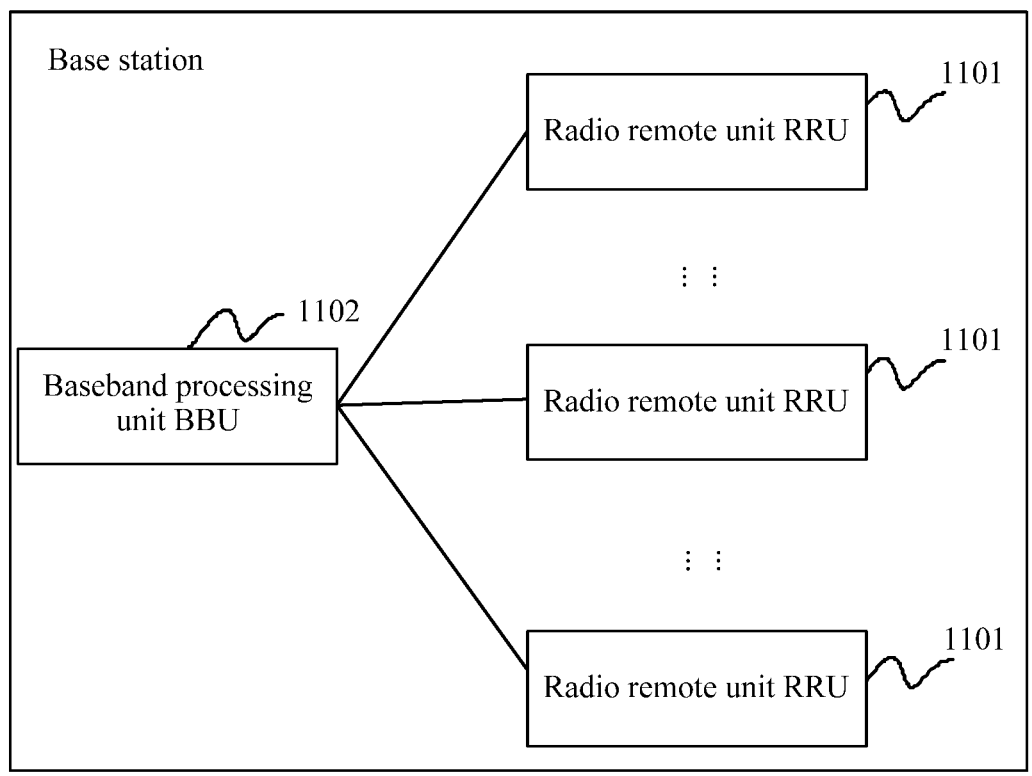
FIG. 11 is a schematic structural diagram of a base station according to an embodiment of this application.

FIG. 11 is a possible schematic structural diagram of a base station according to an embodiment of this application.

In an embodiment, the base station includes a BBU and at least one RRU connected to the BBU. In an embodiment, the base station may further include more BBUs and RRUs. In the embodiment corresponding to FIG. 11, the base station includes a BBU 1102 and a plurality of RRUs 1101 connected to the BBU 1102. The BBU 1102 can support the functions of the BBU in the foregoing embodiments corresponding to FIG. 3 to FIG. 7. The RRU 1101 can support the functions of the RRU in the foregoing embodiments corresponding to FIG. 3 to FIG. 7.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage channels (including but not limited to a magnetic disk memory, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine instruction, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method of passive intermodulation (PIM) elimination, comprising:
    obtaining, by a network device, N pieces of backhauled information from a plurality of radio remote units (RRUs),
        wherein one piece of the N pieces of backhauled information comprises initial phase information of each carrier on one transmit channel,
        wherein at least one carrier is on the one transmit channel,
        wherein the one piece of the backhauled information is received by the network device on a receive channel of the network device,
        wherein the initial phase information of each carrier on the one transmit channel is determined when a numerically controlled oscillator (NCO) generates the at least one carrier on the one transmit channel, and
        wherein N is an integer greater than 1; and
    eliminating, by the network device, a PIM of a received signal on the receive channel on the network device based on the initial phase information of each carrier on the one transmit channel and a baseband signal.

2. The method according to claim 1, wherein the N pieces of backhauled information are N backhauled signals, and one of the backhauled signals is one single carrier signal on which frequency-shift has been performed and that is on a transmit channel, or one multi-carrier mixed signal on which multicarrier combining has been performed and that is on a transmit channel, and wherein after obtaining the single carrier signal on which frequency-shift is performed or the one multi-carrier mixed signal on which multicarrier combining is performed, the network device obtains a signal including the initial phase information of the at least one carrier.

3. The method according to claim 2, wherein at least one of the following processing may further be performed on the backhauled signals:
    crest factor reduction (CFR) processing, digital pre-distortion (DPD) processing, and radio frequency power amplification and feedback processing.

4. The method according to claim 3, wherein the network device is a baseband processing unit (BBU), and the method further comprises:
    sending, by M RRUs connected to the network device, the N pieces of backhauled information to the network device, wherein M is an integer greater than 1 and less than or equal to N.

5. The method according to claim 3, wherein the network device is an RRU, and the method further comprises:
    sending, by M RRUs other than the network device, the N pieces of backhauled information to the network device, wherein M is an integer greater than 1 and less than or equal to N; wherein
    the M RRUs and the network device are connected to a same baseband processing unit (BBU).

6. The method according to claim 2, wherein the network device is an RRU, and the method further comprises:
- sending, by M RRUs other than the network device, the N pieces of backhauled information to the network device, wherein M is an integer greater than 1 and less than or equal to N; wherein
- the M RRUs and the network device are connected to a same baseband processing unit (BBU).

7. The method according to claim 2, wherein the network device is an RRU, and the method further comprises:
- receiving, by a baseband processing unit (BBU) connected to the network device, the N pieces of backhauled information sent by M RRUs, wherein M is an integer greater than 1 and less than or equal to N; and
- sending, by the BBU, the N pieces of backhauled information to the network device.

8. The method according to claim 2, wherein the network device is a baseband processing unit (BBU), and the method further comprises:
- sending, by M RRUs connected to the network device, the N pieces of backhauled information to the network device, wherein M is an integer greater than 1 and less than or equal to N.

9. The method according to claim 1, wherein the network device is a baseband processing unit (BBU), and the method further comprises:
- sending, by M RRUs connected to the network device, the N pieces of backhauled information to the network device, wherein M is an integer greater than 1 and less than or equal to N.

10. The method according to claim 9, wherein that the RRUs send the backhauled information comprises:
- dividing, by the RRUs, at least one piece of to-be-sent backhauled information into K segments of information, and sending each of the K segments of information, wherein K is an integer greater than or equal to 1; or
- interleaving, by the RRUs, at least one piece of to-be-sent backhauled information, dividing the to-be-sent backhauled information into K segments of information, and sending each of the K segments of information, wherein K is an integer greater than or equal to 1.

11. A network device, comprising:
- a receiver, configured to receive N pieces of backhauled information from a plurality of radio remote units (RRUs),
  - wherein one piece of the N pieces of backhauled information comprises initial phase information of each carrier on one transmit channel,
  - wherein at least one carrier is on the one transmit channel,
  - wherein the one piece of the backhauled information is received on a receive channel of the network device,
  - wherein the initial phase information of each carrier on the one transmit channel is determined when a numerically controlled oscillator (NCO) generates the at least one carrier on the one transmit channel, and
  - wherein N is an integer greater than 1; and
- a processor, configured to eliminate a passive intermodulation (PIM) of a received signal on the receive channel on the network device based on the initial phase information of each carrier on the one transmit channel and a baseband signal.

12. The network device according to claim 11, wherein the N pieces of backhauled information are N backhauled signals, and the N backhauled signals are respectively single carrier signals on which frequency-shift has been performed and that are on N transmit channels, or multi-carrier mixed signals on which multicarrier combining has been performed and that are on N transmit channels, and wherein after obtaining the single carrier signal on which frequency-shift is performed or the one multi-carrier mixed signal on which multicarrier combining is performed, the network device obtains a signal including the initial phase information of the at least one carrier.

13. The network device according to claim 11, wherein the network device is a base band unit (BBU).

* * * * *